(No Model.) 2 Sheets—Sheet 1.
E. H. C. OEHLMANN & J. F. H. GRONWALD.
STERILIZING APPARATUS.
No. 459,302. Patented Sept. 8, 1891.
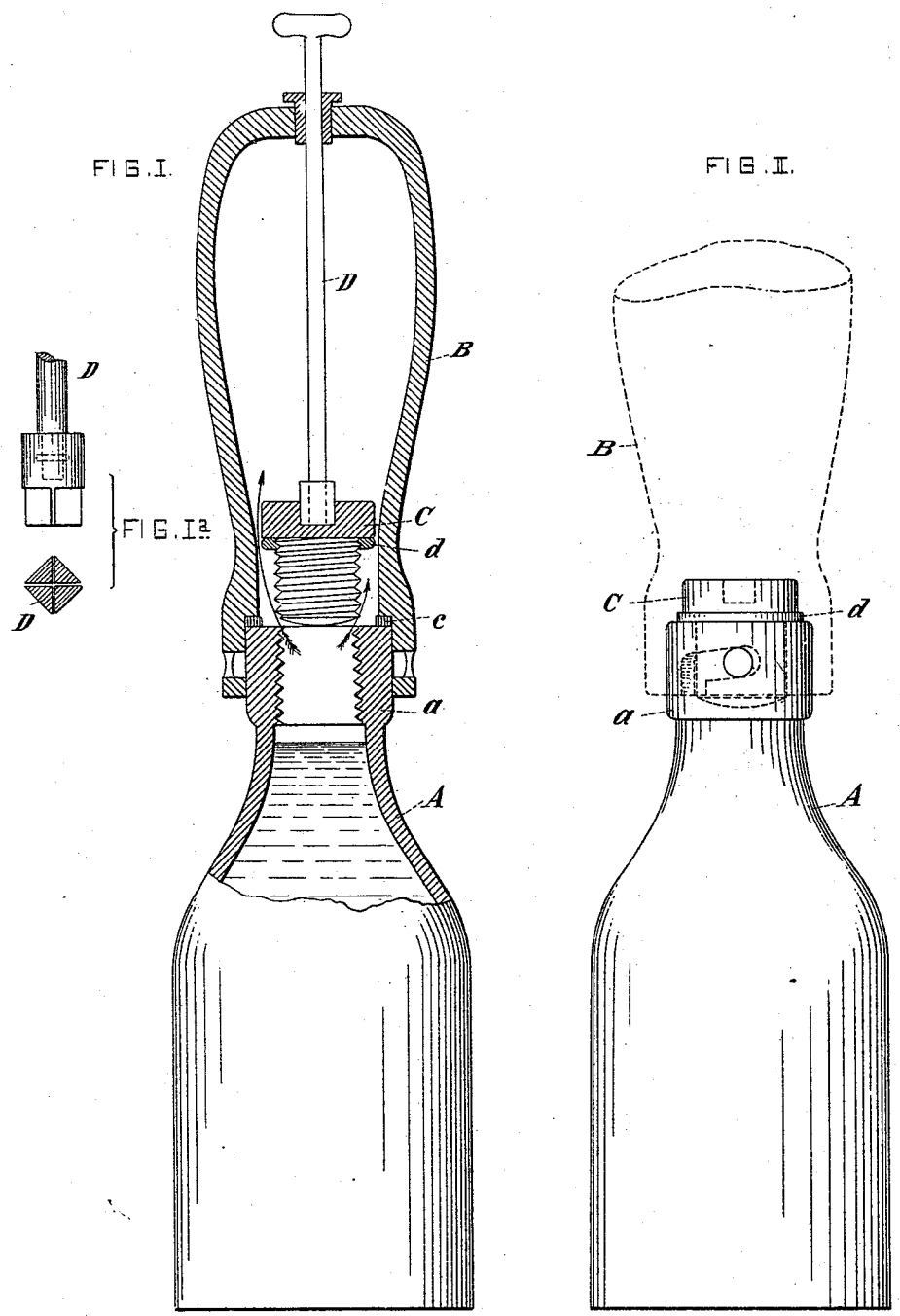

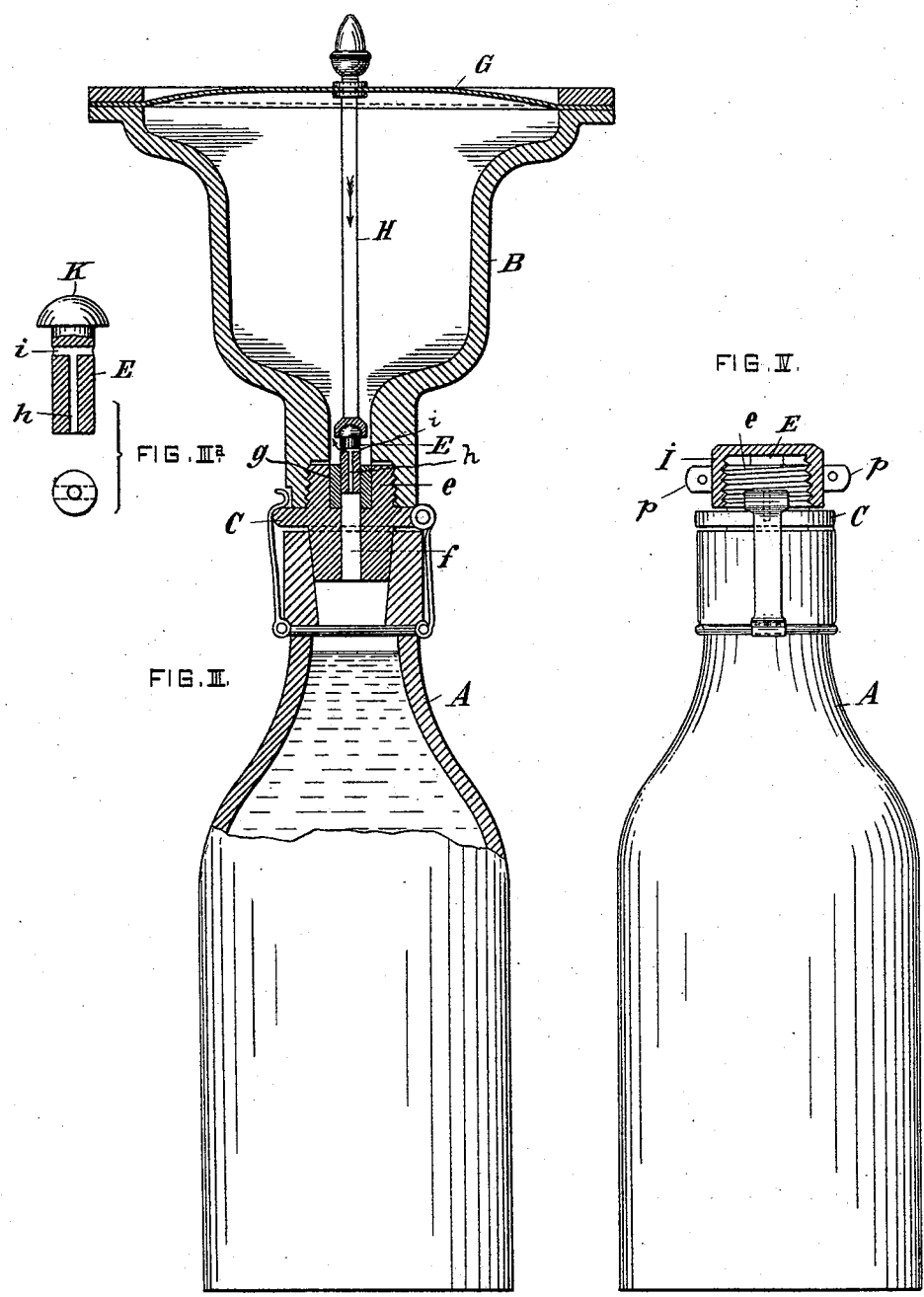

UNITED STATES PATENT OFFICE.

EMIL HEINRICH CONRAD OEHLMANN AND JOHANN FRANZ HUGO GRONWALD, OF BERLIN, GERMANY.

STERILIZING APPARATUS.

SPECIFICATION forming part of Letters Patent No. 459,302, dated September 8, 1891.

Application filed March 1, 1890. Serial No. 342,316. (No model.)

*To all whom it may concern:*

Be it known that we, EMIL HEINRICH CONRAD OEHLMANN and JOHANN FRANZ HUGO GRONWALD, both subjects of the King of Prussia, residing at Berlin, Prussia, Germany, have invented new and useful Improvements in Apparatus for Sterilizing Milk and other Fluids, of which the following is a full, clear, and exact description.

The present invention has for its object a sterilizing apparatus for fluids of all kinds, and it enables us not only to sterilize the contents of the vessel and to close the latter hermetically against the air, but also to fill the vessel as far as desired with the sterilized fluid without exposing the fluid to subsequent deterioration or the vessel to bursting. All sterilizing apparatus hitherto known, if they effect the closing of the vessel with the exclusion of the atmospheric air, (which is the only possible way to put up sterilized fluids for preservation,) present, as far as we are aware, the disadvantage that either there is a vacuum in the vessel above the sterile fluid or that the vessel must be completely filled. In the first case the vacuum will in time attract atmospheric air into the vessel, as there is no closing device which is perfectly air-tight, and when atmospheric air has penetrated into the vessel the sterilized fluid is of course exposed to deterioration. In the second case, when the vessel is completely filled with the sterilized fluid, it will be burst by an expansion of the contents resulting from an increase of temperature.

Our invention has for its purpose to avoid these disadvantages and to enable the use of common bottles in connection with the apparatus.

The essential feature of the new sterilizing apparatus is an air-tight expansion-chamber arranged in such a manner that the air contained in the same is sterilized simultaneously with the fluid contained in the vessel, so that after the closing of the vessel, while excluding the atmospheric air, the space in the vessel above the sterile fluid is occupied by sterile air. This will prevent the atmospheric air from penetrating into the vessel if the same is closed with any of the so-called "air-tight stoppers," and an expansion of the fluid contained in the vessel will not burst the same, as the air-cushion will prevent such prejudicial effect.

In the annexed drawings, which form a part of this specification, Figures I and III represent different forms of the new apparatus as used in connection with the different stoppers shown in Figs. II and VI. Figs. I<sup>a</sup> and III<sup>a</sup> represent details of the apparatus hereinafter more fully described.

The sterilizing apparatus consists of the vessel for the reception of the fluid, in the present case a glass jar A and the expansion-chamber B, Fig. I. The neck $a$ of the jar can be threaded both at the inside and the outside, or a so-called "Caponet" stopper may be used, as shown in Figs. I and II, so that the expansion-chamber B can be attached air-tight to the same by inserting a rubber ring $c$, Fig. I. The jar is closed by a threaded stopper C, provided with a rubber ring $d$. This stopper C is provided at its head with a recess, wherein is inserted the slit and elastic square of the rod D, which rod passes through an air-tight stuffing-box in the upper end of the expansion-chamber.

If it is desired, for instance, to sterilize milk, the jar A is first filled with milk to the desired quantity. The stopper C is not put on the jar, but is pushed on the elastic square of the rod D. Then the expansion-chamber B is arranged air-tight on the neck $a$ of the jar, and the milk in the jar is then heated in a steam or water bath. The milk will now expand and is allowed to pass into the chamber B. The water-vapor formed by the heating of the milk will now be mixed with the air contained in the expansion-chamber and will sterilize the same. As soon as the milk is sufficiently heated, so that the same is sterilized together with the air in the expansion-chamber, the apparatus is taken out of the steam or water bath and put aside for cooling. The expanded milk will be contracted again by the cooling and flow back into the jar. The water-vapors will also be condensed again and will also re-enter into the jar, so that after the complete cooling the quantity contained in the jar and also the contained materials will be exactly the same in quantity as before the process. The rod D is then pushed down, and by turning it the stopper C is screwed down air-tight in the neck of the jar, Fig, II, whereupon the rod D is pulled upward, thereby releasing the stopper, and the condensation-chamber B is removed. The jar A is now filled with sterilized milk ready for transport without presenting any of the disadvantages mentioned in the preamble to this description.

If it is desired to use in connection with the apparatus ordinary bottles, closed, for instance, with the so-called "Granel" stopper, (represented in Figs. III and IV,) these stoppers may be altered as follows: On the upper part of the stopper C is arranged a small cylinder $e$, threaded at the outside and containing a small closing-ring $g$, the central hole in which corresponds to the longitudinal passage $f$ through the center of the stopper C. The hole of the closing-ring $g$ can be closed by means of the stud or stopper E, Fig. III$^a$. In order to enable the milk to freely expand during the sterilization, this stud or stopper is provided with a central passage $h$, ending in a cross-passage $i$, Fig. III$^a$. In this arrangement the stud E need not be turned for the purpose of closing the passage, which can be effected by merely pushing down the said stud. The expansion-chamber may also be modified in a manner, giving a still better closing off of the atmospheric air than with the stuffing-box arrangement shown in Fig. I—namely, by closing the expansion-chamber with a diaphragm G, a pushing-bar H being substituted for the rod D. During the sterilization, the stud E is loosely fitted in the closing-ring $g$, so that the expanding milk can enter through the central and cross passages of the stud E into the expansion-chamber. The stud E bears during this time with its head K against the pushing-bar H, so that the expanding milk cannot force the stud out of the stopper. As soon as the sterilization of the milk and air is completed and the milk is cooled, the simple pushing down of the diaphragm G is all that is required to force the stud E so far down into the closing-ring that its cross-passage $i$ is also covered by the ring, and consequently closed air-tight. After the removal of the expansion-chamber a cap I is then screwed on the cylinder $e$, pressing on the stud E and not only forcing the same farther into the ring $g$, but also preventing a loosening of the same. The lateral projections or wings P of the cap I facilitate its handling and also allow of the arrangement of a plumbing-string.

Instead of the closing device shown in Figs. III and IV, the so-called "Fritzner" stopper may also be used.

The use of the diaphragm G obviously permits of numerous modifications of the expansion-chamber and diaphragm. Not only the upper part, but the whole chamber may be made of an elastic material—for instance, rubber. For the purpose of pushing down the stopper it will then be sufficient to press down the top of the expansion-chamber; or, for holding up the stopper, the sides of the chamber may be closed together by hand. The use of expansion-chambers provided with a diaphragm or made of an elastic material presents, moreover, the advantage that the sterile air can be compressed in the receptacle A, so that the sterile milk is then placed under an increased air-pressure.

Having fully described our invention, what we claim as new, and desire to secure by Letters Patent, is—

1. In a sterilizing apparatus, the combination, with the vessel adapted to contain the material to be sterilized, of an elastic expansion-chamber closed at the top and having an air-tight connection with the said receptacle, whereby part of the treated material when heated will enter said expansion-chamber and when cooled will flow back into said receptacle, and means for closing the said receptacle without displacement of the expansion-chamber, substantially as set forth.

2. In a sterilizing apparatus, the combination, with the receptacle containing the material to be treated and a screw-stopper for the same, of an expansion-chamber closed at the top and having an air-tight connection with said receptacle and provided with means for engaging and rotating the said stopper to cause it to tightly close the mouth of the said receptacle without displacement of the expansion-chamber, substantially as set forth.

3. In a sterilizing apparatus, the combination, with the receptacle having its mouth provided with an internal screw-thread, a threaded stopper having an enlarged top, and a recess in said enlarged top, of the expansion-chamber having an air-tight connection with said receptacle, and the rod D, having one end engaging the recess in the stopper for causing the stopper to enter the mouth of the receptacle without displacement of the expansion-chamber, substantially as set forth.

In witness whereof we have hereunto set our hands in presence of two witnesses.

EMIL HEINRICH CONRAD OEHLMANN.
JOHANN FRANZ HUGO GRONWALD.

Witnesses:
ALEX. SCHOLZE,
A. REICHERDS.